United States Patent Office 3,699,098
Patented Oct. 17, 1972

3,699,098
CARBOXAMIDES OF BENZOTRIAZEPINES
Silvano Rossi, Milan, Italy, assignor to Roussel-UCLAF,
Paris, France
No Drawing. Filed Dec. 31, 1970, Ser. No. 103,319
Claims priority, application France, Dec. 30, 1969,
6945435
Int. Cl. C07d 55/54
U.S. Cl. 260—239.3 B                        14 Claims

ABSTRACT OF THE DISCLOSURE

Novel carboxamides of 1,2,5-benzotriazepines of the formula

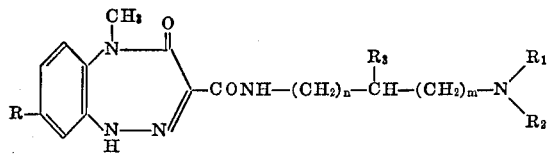

wherein R is selected from the group consisting of hydrogen, halogen, hydroxy, nitro and methoxy, $R_1$ and $R_2$ may be different and are alkyl of 1 to 4 carbon atoms and when taken together with the nitrogen atom to which they are attached form a heterocyclic ring which may contain another hetero atom, $R_3$ is selected from the group consisting of hydrogen and alkyl of 1 to 4 carbon atoms, $m$ and $n$ have the value of 0, 1, 2, or 3 with the sum of $m$ and $n$ being not less than 1 and not more than 3 and their non-toxic, pharmaceutically acceptable acid addition salts and quaternary ammonium derivatives which have a vasodilatatory activity and their preparation and therapeutic use.

STATE OF THE ART

Belgium Pat. No. 711,467 describes certain 3-carboxamido-1,2,5-benzotriazepines-4-ones which possess a central nervous system depressant activity which is manifested by tranquillizing, anti-convulsant, analgesic, anti-inflammatory and very strong sedative effects. The compounds of the invention have a completely different pharmacological activity.

OBJECTS OF THE INVENTION

It is an object of the invention to provide novel carboxamides of 1,2,5-benzotriazepines of Formula I and their salts.

It is another object of the invention to provide a novel process for the preparation of the 1,2,5-benzotriazepines of Formula I.

It is another object of the invention to provide novel vasodilatatory compositions.

It is a further object of the invention to provide a novel method inducing a vasodilatatory effect in warm-blooded animals.

These and other objects and advantages of the invention will become obvious from the following detailed description.

THE INVENTION

The novel compounds of the invention are selected from the group consisting of carboxamides of 1,2,5-benzotriazepines of the formula

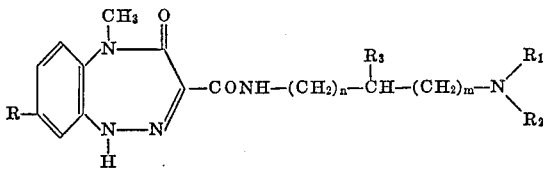

I wherein R is selected from the group consisting of hydrogen, halogen, hydroxy, nitro and methoxy. $R_1$ and $R_2$ may be different and are alkyl of 1 to 4 carbon atoms and when taken together with the nitrogen atom to which they are attached form a heterocyclic ring which may contain another hetero atom, $R_3$ is selected from the group consisting of hydrogen and alkyl of 1 to 4 carbon atoms, $m$ and $n$ have the value of 0, 1, 2, or 3 with the sum of $m$ and $n$ being not less than 1 and not more than 3 and their non-toxic, pharmaceutically acceptable acid addition salts and quaternary ammonium derivatives.

Examples of suitable acids for the formation of the acid addition salts are non-toxic, pharmaceutically acceptable inorganic acids such as hydrochloric acid, sulfuric acid, perchloric acid or nitric acid and organic acids such as formic acid, tartaric acid, etc.

The quaternary ammonium derivatives can be formed by reacting a compound of Formula I with an ester or halide of an aliphatic group such as methyl, ethyl, propargyl, etc. or an aralkyl such as benzyl.

Examples of specific compounds of the invention are

3-[N-(β-dimethylaminoethyl)carbamoyl]-5-methyl-1H 4,5-dihydro-1,2,5-benzotriazepine-4-one;
N-iodo methylate of 3-[N-(β-dimethylaminoethyl)carbamoyl]-5-methyl-1H 4,5-dihydro-1,2,5-benzotriazepine-4-one;
3-[N-(β-diethylaminoethyl)carbamoyl]-5-methyl-1H 4,5-dihydro-1,2,5-benzotriazepine-4-one;
3-[N-(β-diethylaminoethyl)carbamoyl]-5-methyl-8-chloro-1H 4,5-dihydro-1,2,5-benzotriazepine-4-one;
3-[N-(β-dimethylaminoethyl)carbamoyl]-5-methyl-8-chloro-1H 4,5-dihydro-1,2,5-benzotriazepine-4-one;
3-[N-(β-pyrrolidinoethyl)carbamoyl]-5-methyl-1H 4,5-dihydro-1,2,5-benzotriazepine-4-one;
3-[N-(β-morpholinoethyl)carbamoyl]-5-methyl-1H 4,5-dihydro-1,2,5-benzotriazepine-4-one;
3-[N-(β-diethylamino-β-methylethyl)carbamoyl]-5-methyl-1H 4,5-dihydro-1,2,5-benzotriazepine-4-one;
3 - [N - (β - dimethylamino - β - methylethyl)carbamoyl] - 5-methyl-8-chloro-1H 4,5-dihydro-1,2,5-benzotriazepine-4-one;
3 - [N - (β - diisopropylaminoethyl)carbamoyl]-5-methyl-1H 4,5-dihydro-1,2,5-benzotriazepine-4-one; and
3 - [N - (β - diisopropylaminoethyl)carbamoyl]-5-methyl-8-chloro-1H 4,5-dihydro-1,2,5-benzotriazepine-4-one.

The novel process for the preparation of the compounds of Formula I comprises reacting a 1H 4,5-dihydro-1,2,5-benzotriazepine of the formula

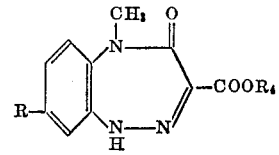

II wherein R has the above definition and $R_4$ is selected from the group consisting of hydrogen and alkyl of 1 to 4 carbon atoms with an alkylene diamine of the formula

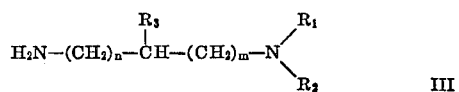

III wherein $R_1$, $R_2$, $R_3$, $n$ and $m$ have the above definitions to form the corresponding carboxamide of Formula I. If desired, the product can by treating an aqueous mineral or organic acid obtain the corresponding acid addition salt or with a quaternizing agent to form the corresponding quaternary ammonium derivative. The reaction can be effected in the absence or presence of an organic solvent such as xylene.

The 1H 4,5-dihydro-1,2,5-benzotriazepines of Formula II used as the starting materials may be prepared by reacting a nitrosation agent with a carbalkoxy acetyl o-phenylene diamine of the formula

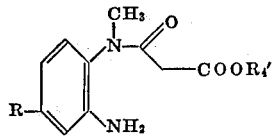

wherein R has the above definition and $R_4$ is alkyl of 1 to 4 carbon atoms to form the corresponding diazonium salt which is cyclized at a pH above 4 to the compound of Formula II which can be saponified to the corresponding carboxylic acid. The preparation is described in detail by Rossi et al. in Tetrahedron, vol. 24 (1968), p. 6395–6409.

In contrast to the benzotriazepines described in Belgian Pat. No. 711,467, the compounds of the invention have a completely distinct pharmacological activity. The introduction of the aminoalkyl chain into the amide function not only causes the action on the central nervous system to disappear or to become much less, it provides a new unexpected pharmacological property. Due to the vasodilatatory property, the compounds have a therapeutic use different from central nervous system depressants or sedatives and may be administered conjointly with a product active upon the central nervous system.

The novel vasodilatatory compositions of the invention are comprised of an effective amount of at least one compound of Formula I, acid addition salts or quaternary ammonium derivatives thereof and a major amount of a pharmaceutical carrier. The usual daily dose for infants is 3 to 15 mg. and for adults is 15 to 100 mg. The preferred individual dose is 2 to 25 mg. depending on the administration method. The compositions may be in the form of drinkable or injectable solutions or suspensions in ampoules or multiple dose flacons, in the form of tablets, dragées, coated tablets progressively crumbling tablets, sachets, capsules, granules, syrups, drops and suppositories.

The compositions are useful for the treatment of arteriosclerosis, of thromboembolic disorders, vasomotive disorders of the extremities such as Raynaud malady, acryocyanosis, acroparesthesis or arteritisis, of series of nervous alternations and cerebral vascular troubles generally tied to cerebral arteriosclerosis.

The compositions, on the other hand, have a net hypotensive effect and therefore may be used in the treatment of arterial hypertension. The compositions may also contain other therapeutic products having antispasmodic activity, vasodilatatory activity or anticoagulant activity to treat troubles of venous circulation. For the treatment of arteriosclerosis, the compositions can be associated with products having andrenolytic activity or vitamins of the P group or products activating the oxidation of cardiac or cerebral tissue.

The novel method of inducing vasodilatatory activity in warm-blooded animals comprises administering to warm-blooded animals a safe and effective amount of a compound of Formula I or its acid addition salts or its quaternary ammonium derivatives. The active compounds may be administered parenterally, orally or rectally. The usual useful daily dose 0.2 to 2.0 mg./kg. depending upon the method of administration.

In the following examples there are described several preferred embodiments to illustrate the invention. However, it should be understood that the invention is not intended to be limited to the specific embodiments.

EXAMPLE I

Preparation of 3-[N-(β-dimethylaminoethyl)carbamoyl]-5-methyl-1H 4,5-dihydro-1,2,5-benzotriazepine-4-one A suspension of 20 gm. of 3-carbethoxy-5-methyl-1H 4,5-dihydro-1,2,5-benzotriazepine-4-one [obtained by the process in Tetrahedron, vol. 24 (1968), pp. 6395–6409] in 200 cc. of xylene was admixed with 20 g. of N,N-dimethylamino-ethylene-diamine and the mixture was refluxed for 10 hours. Then, another 10 g. of N, N-dimethylamino-ethylenediamine were added thereto and the mixture was refluxed for 8 hours. The mixture was cooled and filtered and the precipitate was washed with petroleum ether to obtain 20.2 g. (86.5% yield) of 3-[N-(β-dimethylaminoethyl)carbamoyl]-5-methyl-1H 4,5-dihydro-1,2,5-benzotriazepine-4-one melting at 159–161° C.

As far as is known, this compound is not described in the literature.

EXAMPLE II 7 g. of 3-[N-(β-dimethylamino ethyl)carbamoyl]-5-methyl-1H 4,5-dihydro-1,2,5-benzotriazepine-4-one produced in Example I were dissolved in 250 cc. of acetone and after heating the solution slightly, 7 cc. of methyl iodide were added thereto with agitation at room temperature. The mixture was filtered and the precipitate was washed acetone to obtain 9 g. of N-iodo methylate of 3-[N-(β-dimethylaminoethyl)carbamoyl]-5-methyl-1H 4,5-dihydro-1,2,5-benzotriazepine-4-one melting at 177–180° C.

As far as is known, this compound is not described in the literature.

EXAMPLE III

Preparation of 3-[N-(β-diethylaminoethyl)carbamoyl]-5-methyl-1H 4,5-dihydro-1,2,5-benzotriazepine-4-one 50 cc. of N,N-diethylaminoethylene-diamine were added to a suspension of 20 g. of 3-carbethoxy-5-methyl-1H 4,5-dihydro-1,2,5-benzotriazepine-4-one in 200 cc. of xylene and the mixture was refluxed for 10 hours. After cooling, the mixture was filtered and the precipitate was washed with petroleum ether to obtain 13.5 g. of 3-[N-(β-diethylaminoethyl)carbamoyl]-5-methyl-1H 4,5-dihydro-1,2,5-benzotriazepine-4-one. Concentration of the mother liquors gave a second crop of 7 g. of the said product. The two crops were combined and crystallized from xylene to obtain 17.7 g. (69% yield) of the desired product melting at 109–111° C.

As far as is known, this compound is not described in the literature.

EXAMPLE IV 50 g. of N,N-diethylaminoethylene-diamine were added to a suspension of 20 g. of 3-carbethoxy-5-methyl-8-chloro-1H 4,5-dihydro-1,2,5-benzotriazepine-4-one in 50 cc. of xylene and the mixture was refluxed for 10 hours. Excess diethylamino-ethylene diamine was eliminated by distillation and the mixture was cooled to obtain 20 g. of 3-[N-(β-diethylaminoethyl)carbamoyl]-5-methyl-8-chloro - 1H 4,5-dihydro-1,2,5-benzotriazepine-4-one in the form of yellow crystals melting at 153–154° C.

As far as is known, this compound is not described in the literature.

EXAMPLE V

Using the procedure of Example I, 3-carbethoxy-5-methyl-8-chloro-1H 4,5-dihydro-1,2,5-benzotriazepine-4-one and N,N-dimethylaminoethylenediamine were reacted to form 3 - [N - (β - dimethylaminoethyl)carbamoyl]-5-methyl-8-chloro-1H 4,5-dihydro-1,2,5-benzotriazepine-4-one melting at 184–186° C.

As far as is known, this compound is not described in the literature.

EXAMPLE VI

Using the procedure of Example I, 3-carbethoxy-5-methyl-1H 4,5-hydro-1,2,5-benzotriazepine-4-one and 2-pyrrolidino ethylamine were reacted to form 3-[N-(β-pyrrolidino ethyl)cabamoyl]-5-methyl-1H 4,5-dihydro-1,2,5-benzotriazepine-4-one melting at 136–138° C.

As far as is known, this compound is not described in the literature.

EXAMPLE VII

Using the procedure of Example I, 3-carbethoxy-5-methyl-1H 4,5-hydro - 1,2,5 - benzotriazepine-4-one and 2-morpholino ethylamine were reacted to form 3-[N-(β-morpholino ethyl)carbamoyl]-5-methyl-1H 4,5-dihydro-1,2,5-benzotriazepine-4-one melting at 191–194° C.

As far as is known, this compound is not described in the literature.

EXAMPLE VIII

Using the procedure of Example I, 3-carbethoxy-5-methyl-1H 4,5-dihydro-1,2,5-benzotriazepine-4-one and 2-diethylaminopropylamine were reacted to form 3-[N-(β - diethylamino-β-methylethyl)carbamoyl]-5-methyl-1H 4,5-dihydro-1,2,5-benzotriazepine-4-one melting at 157–159° C.

As far as is known, this compound is not described in the literature.

EXAMPLE IX

Using the procedure of Example I, 3-carbethoxy-5-methyl-1H 4,5-dihydro-1,2,5-benzotriazepine-4-one and 2-dimethylaminopropylamine were reacted to form 3-[N-(β - dimethylamino-β-methylethyl)carbamoyl]-5-methyl-1H 4,5-dihydro-1,2,5-benzotriazepine-4-one melting at 184–186° C.

As far as is known, this compound is not described in the literature.

EXAMPLE X

Using the procedure of Example I, 3-carbethoxy-5-methyl-1H 4,5-dihydro - 1,2,5 - benzotriazepine-4-one and N,N-diisopropylaminoethylenediamine were reacted to form 3-[N-(β-diisopropylaminoethyl)carbamoyl]-5-methyl-1H 4,5-dihydro-1,2,5-benzotriazepine-4-one melting at 142–144° C.

As far as is known, this compound is not described in the literature.

EXAMPLE XI

Using the procedure of Example I, 3-carbethoxy-5-methyl-1H 4,5-dihydro - 1,2,5 - benzotriazepine-4-one and N,N- diisopropylaminoethylenediamine were reacted to form 3-[N-(β-diisopropylaminoethyl)carbamoyl]-5-methyl-1H 4,5-dihydro-1,2,5-benzotriazepine-4-one melting at 171–173° C.

As far as is known, this compound is not described in the literature.

PHARMACOLOGICAL STUDY (A) Vasodilatatory effect.—The vasodilatatory effect was determined by a perfusion at constant pressure in the posterior thigh of rabbits weighing about 3 kg. anesthesized with urethane. The test compounds were injected into this isolated part of the organism and modifications in the pressure were recorded to determine the vasomotric activity of the products and to register also the carotidienic pressure. The results are shown in Table I.

TABLE I

| Products | Active vasodilatation dose | Active dose for arterial pressure |
|---|---|---|
| 3-[N-(β-diethylaminoethyl)carbamoyl]-5-methyl-1H 4,5-dihydro-1,2,5-benzotriazepine-4-one | 25γ | 25γ |
| 3-[N-(β-diamethylaminoethyl)carbamoyl]-5-methyl-1H 4,5-dihydro-1,2,5-benzotriazepine-4-one | 25γ | 25γ |
| N-iodo methylate of 3-[N-(β-dimethylaminoethyl)carbamoyl]-5-methyl-1H 4,5- dihydro-1,2,5-benzotriazepine-4-one | | 10γ |

As can be seen from the results of Table I, the said compounds possess an important action on the arterial pressure and on vasomotricity.

(B) Acute toxicity determination.—The test compounds were administered at increasing doses to mice of the Rockland strain weighing about 20 g. The products were given intraperitoneally, intravenously and subcutaneously. The mice were kept under observation for 7 days and the $DL_{50}$ was calculated by the statistical method of Tainter and Miller. The results are shown in Table II.

TABLE II

| Products | Intravenous $DL_{50}$ | Intraperitoneal $DL_{50}$ | Subcutaneous $DL_{50}$ |
|---|---|---|---|
| 3-[N-(β-dimethylaminoethyl)carbamoyl]-5-methyl-1H 4,5-dihydro-1,2,5-benzotriazepine-4-one, mg./kg. | 60 | 230 | 230 |
| N-iodo methylate of 3-[N-(β-dimethylaminoethyl)carbamoyl]-5-methyl-1H 4-5-dihydro-1,2,5-benzotriazepine-4-one, mg./kg. | 17.5 | 140 | 75 |
| 3-[N-(β-diethylaminoethyl)carbamoyl]-5-methyl-1H 4,5-dihydro-1,2,5-benzotriazepine-4-one, mg./kg. | 66.5 | 260 | 325 |

Various modifications of the compositions and methods of the invention may be made without departing from the spirit or scope thereof and it is to be understood that the invention is to be limited only as defined in the appended claims.

I claim:

1. A compound selected from the group of 1,2,5-benzotriazepines of the formula

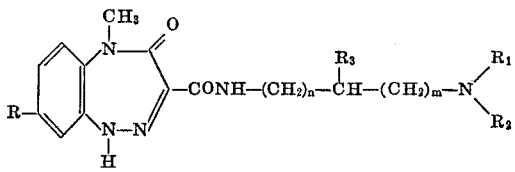

wherein R is selected from the group consisting of hydrogen, halogen, hydroxy, nitro and methoxy, $R_1$ and $R_2$ may be different and are alkyl of 1 to 4 carbon atoms and when taken together with the nitrogen atom to which they are attached form a heterocyclic ring selected from the group consisting of morpholino and pyrrolidino, $R_3$ is selected from the group consisting of hydrogen and alkyl of 1 to 4 carbon atoms, m and n have the value of 0, 1, 2 or 3 with the sum of m and n being not less than 1 and not more than 3 and their non-toxic pharmaceutically acceptable acid addition salts and lower alkyl, propargyl and benzyl quaternary ammonium halides.

2. The lower alkyl, propargyl and benzyl quaternary ammonium halides of the 1,2,5-benzotriazepines of claim 1.

3. A compound of claim 1 selected from the group consisting of 3 - [N - (β - dimethylaminoethyl)carbamoyl] - 5 - methyl - 1H 4,5 - dihydro - 1,2,5 - benzotriazepine - 4 - one, and its non-toxic pharmaceutically acceptable acid addition salts.

4. A compound of claim 1 selected from the group consisting of 3 - [N - (β - diethylaminoethyl)carbamoyl]- 5 - methyl - 1H 4,5 - dihydro - 1,2,5 - benzotriazepine - 4 - one and its non-toxic pharmaceutically acceptable acid addition salts.

5. A compound of claim 1 selected from the group consisting of 3 - [N - (β - diethylaminoethyl)carbamoyl]- 5 - methyl - 8 - chloro - 1H 4,5 - dihydro - 1,2,5 - benzotriazepine-4-one and its non-toxic, pharmaceutically acceptable acid addition salts.

6. A compound of claim 1 selected from the group consisting of 3 - [N - (β - dimethylaminoethyl)carbamoyl] - 5 - methyl - 8 - chloro - 1H 4,5 - dihydro - 1,2,5-benzotriazepine-4-one and its non-toxic, pharmaceutically acceptable acid addition salts.

7. A compound of claim 1 selected from the group consisting of 3 - [N - (β - pyrrolidinoethyl)carbamoyl]- 5 - methyl - 1H 4,5 - dihydro - 1,2,5 - benzotriazepine-4-one and its non-toxic, pharmaceutically acceptable acid addition salts.

8. A compound of claim 1 selected from the group consisting of 3 - [N - (β - morpholinoethyl)carbamoyl]- 5 - methyl - 1H 4,5 - dihydro - 1,2,5 - benzotriazepine-4-one and its non-toxic, pharmaceutically acceptable acid addition salts.

9. A compound of claim 1 selected from the group consisting of 3 - [N - (β - diethylamino - β - methylethyl) carbamoyl - 5 - methyl - 8 - chloro - 1H 4,5 - dihydro-1,2,5 - benzotriazepine - 4 - one and its non-toxic, pharmaceutically acceptable acid addition salts.

10. A compound of claim 1 selected from the group consisting of 3 - [N - (β - diisopropylaminoethyl)carbamoyl] - 5 - methyl - 8 - chloro - 1H 4,5 - dihydro-1,2,5 - benzotriazepine - 4 - one and its non-toxic pharmaceutically acceptable acid addition salts.

11. A compound of claim 1 selected from the group consisting of 3 - [N - (β - diisopropylaminoethyl)carbamoyl] - 5 - methyl - 1H 4,5 - dihydro - 1,2,5 - benzotriazepine-4-one and its non-toxic pharmaceutically acceptable acid addition salts.

12. A compound of claim 1 selected from the group consisting of 3 - [N - (β - diisopropylaminoethyl)carbamoyl] - 5 - methyl - 8 - chloro - 1H 4,5 - dihydro-1,2,5 - benzotriazepine - 4 - one and its non-toxic pharmaceutically acceptable acid addition salts.

13. A compound of claim 1 which is N-iodo methylate of 3 - [N - (β - dimethylaminoethyl)carbamoyl] - 5-methyl-1H 4,5-dihydro-1,2,5-benzotriazepine-4-one.

14. A compound of claim 1 wherein $R_1$ and $R_2$ together with the nitrogen atom to which they are attached form a heterocyclic selected from the group consisting of morpholino and pyrrolidino.

References Cited

Rossi et al.: "Tetrahedron," 1968, pp. 6395–6409.

Derwentz Belgian Patent Reports, abstracting Belgian Pat. No. 711,464 patented Aug. 29, 1969.

HENRY R. JILES, Primary Examiner

R. T. BOND, Assistant Examiner

U.S. Cl. X.R.

424—244, 248, 274